UNITED STATES PATENT OFFICE.

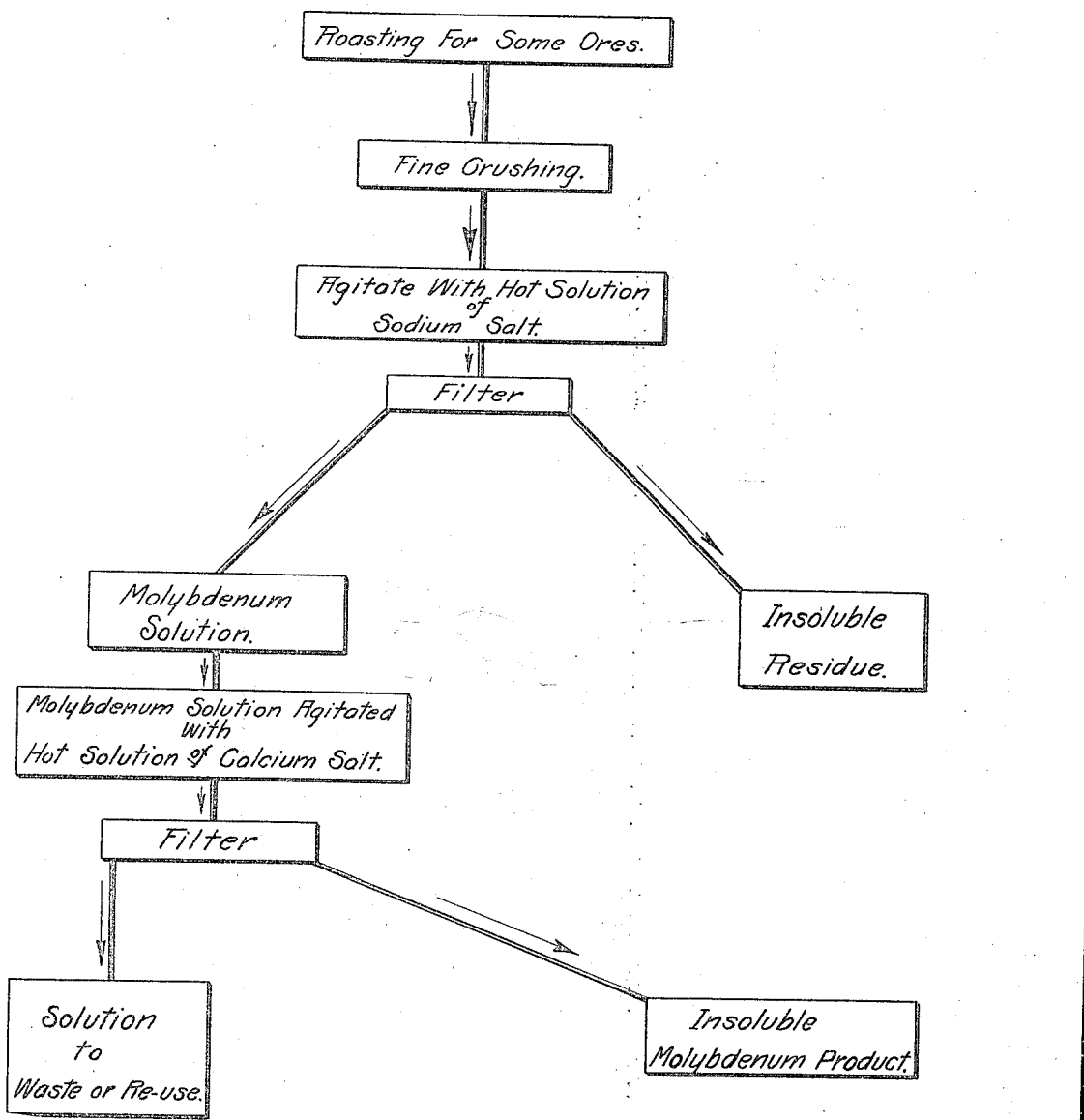

ALAN KISSOCK, OF TUCSON, ARIZONA.

PROCESS FOR TREATING MOLYBDENUM ORES.

1,403,035. Specification of Letters Patent. Patented Jan. 10, 1922.

Application filed May 6, 1918, Serial No. 232,886. Renewed August 15, 1921. Serial No. 492,636.

*To all whom it may concern:*

Be it known that I, ALAN KISSOCK, a citizen of the United States, residing at Tucson, county of Pima and State of Arizona, have invented certain new and useful Improvements in Processes for Treating Molybdenum Ores; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an improved method for obtaining molybdenum in commercial form from its ores, and the object is to accomplish the same by a simpler and cheaper method than heretofore.

The process is set forth diagrammatically in the accompanying drawing.

Both of the two principal molybdenum ores may be handled, namely, wulfenite ($PbMoO_4$) and molybdenite ($MoS_2$). In the case of the latter, a preliminary roasting to convert the sulfid to oxid ($MoO_3$) is necessary.

The ore is crushed to 200 mesh or finer and is then placed in an agitator and while being agitated is boiled with a solution of a sodium salt or other compound which will dissolve the molybdenum. In the case of wulfenite sodium sulfid ($Na_2S$) is used. In the case of the roasted molybdenite sodium carbonate ($Na_2CO_3$) is used preferably, since it is cheaper than sodium sulfid and equally efficient in this instance, but the sulfid may be used as may sodium hydroxid ($NaOH$).

The molybdenum is thereby converted into a soluble form probably sodium molybdate ($Na_2MoO_4$), while the lead and like metals of the ore either are converted into insoluble forms probably sulfids or remain unchanged. The molybdenum solution is filtered off, the residue being further treated if desired for such values as it contains.

The molybdenum solution is conducted to another agitator and boiled therein with a suitable agent for precipitating the molybdenum in a desirable insoluble form. Such an agent is preferably some soluble salt of calcium, as calcium chlorid ($CaCl_2$), in which case the molybdenum is precipitated as calcium molybdate ($CaMoO_4$). The molybdenum product is filtered from the solution and is then ready for the electric furnace or other commercial use, the solution being discarded or reused as advantageous or desirable.

What I claim is:—

1. In a process for recovering molybdenum as a salt, the step comprising dissolving a molybdenum compound in a solution of a sulfid of an alkali-metal.

2. The process of recovering molybdenum as a salt, comprising dissolving a molybdenum compound by boiling in a solution of a sulfid of an alkali-metal and boiling the solution obtained with a soluble alkali-earth compound to precipitate the molybdenum in an available insoluble form.

3. The process of recovering molybdenum as a salt, comprising dissolving the molybdenum compound in a solution of a sulfid of an alkali-metal, and treating the solution obtained with a soluble alkali-earth compound to precipitate the molybdenum in insoluble form.

4. The process of recovering molybdenum as a salt, comprising dissolving a molybdenum compound in a solution of a sulfid of an alkali-metal, and treating the solution obtained with a soluble calcium compound to precipitate the molybdenum as calcium molybdate.

5. The process of recovering molybdenum as a salt, comprising dissolving a molybdenum compound by boiling in a solution of a sulfid of an alkali-metal and boiling the solution obtained with a solution of a calcium salt to obtain the molybdenum in an available insoluble form.

In testimony whereof I affix my signature.

ALAN KISSOCK.